Aug. 13, 1963   A. NATHAN ETAL   3,100,839
GENERAL PURPOSE COMPENSATED DIODE FUNCTION GENERATOR
Filed Sept. 2, 1959                               2 Sheets-Sheet 1

INVENTOR.

BY

Aug. 13, 1963        A. NATHAN ETAL        3,100,839
GENERAL PURPOSE COMPENSATED DIODE FUNCTION GENERATOR
Filed Sept. 2, 1959        2 Sheets-Sheet 2
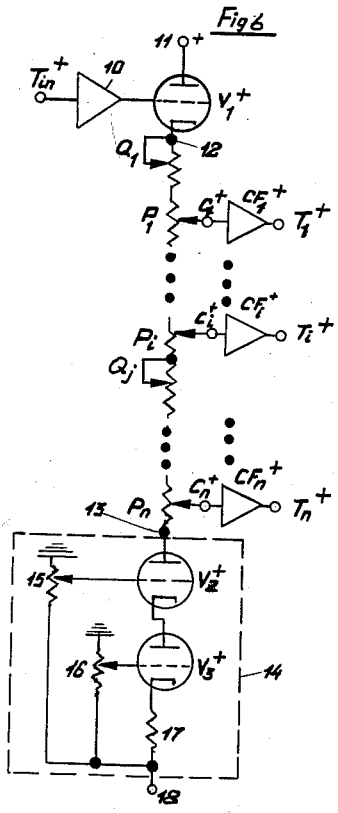
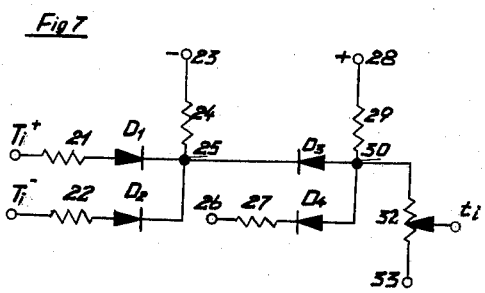
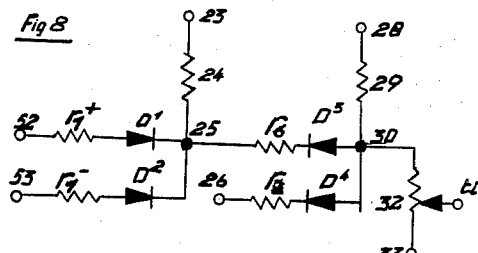
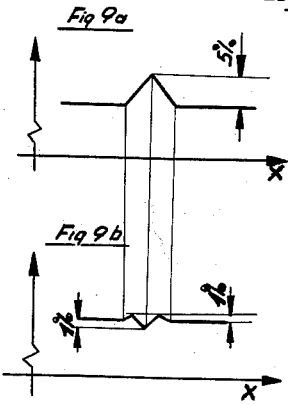
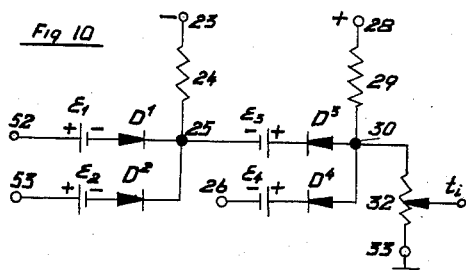
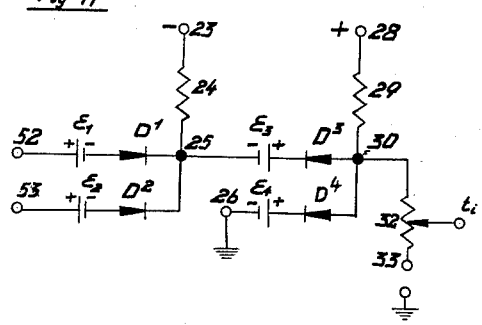
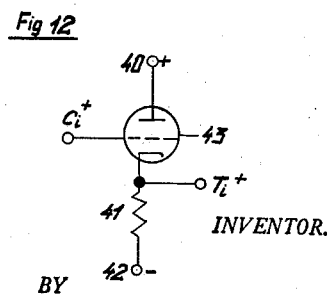
INVENTOR.
BY United States Patent Office 3,100,839
Patented Aug. 13, 1963

3,100,839
GENERAL PURPOSE COMPENSATED DIODE
FUNCTION GENERATOR
Amos Nathan, Haifa, and Jacob Katzenelson, Tel-Aviv,
Israel, assignors to Technion Research and Development Foundation Ltd., Haifa, Israel
Filed Sept. 2, 1959, Ser. No. 837,614
12 Claims. (Cl. 235—197)

This invention pertains to a general purpose piecewise-linear one dimensional function generator using diodes as non-linear elements and having an easily adjustable transfer characteristic; a transfer characteristic denoting the curve obtained by plotting the values of an output signal as a function of the input signal; said function generator including compensating resistors improving its accuracy.

Function generators of arbitrary functions according to this invention are frequently required as generators of arbitrary voltages or in connection with analog computers. Another use of this invention is an input unit to multivariate interpolating function generators.

It is an object of this invention to provide an easily adjustable piecewise-linear function generator which stores given function values at equal intervals of the independent variable, having an accuracy compatible with the requirements of practical usage.

A further object of this invention is the provision of a function generator with independent adjustment of the stored function values.

Another object of this invention is the provision of compensating means in such a function generator for the improvement of its accuracy.

Yet another object of this invention is the provision of a convenient input device for such a function generator.

Still another object of this invention is the provision of an input device for interpolating multivariate function generators.

Other objects and advantages of this invention will become apparent from the following description taken in conjunction with the accompanying drawings in which FIGURE 1 is a plot of the triangle function, being a basic transfer characteristic of one channel of the function generator of this invention;

FIGURE 6 is a diagram of one embodiment of block $A^+$ ($A^-$) of the block diagram of FIGURE 5;

FIGURE 7 is a schematic diagram of one embodiment of block $B_1$ of the block diagram of FIGURE 5;

FIGURE 8 is an equivalent schematic diagram of block $B_1$ of FIGURE 7;

FIGURES 9a and 9b illustrate the transfer characteristic of a function generator with and without compensation;

FIGURE 10 is an equivalent schematic diagram of block $B_1$ of FIGURE 7 applicable when only one diode of each pair conducts;

FIGURE 11 is an equivalent schematic diagram of block $B_1$ of FIGURE 7, applicable when only one diode of each pair conducts; and when terminal 26 is grounded;

FIGURE 12 is a schematic diagram of one embodiment of block $CF_i^+$ ($CF_i^-$) of FIGURE 5.

Let $f(x)$ be a given function of $x$. The $F(x)$ is a piecewise-linear approximation to $f(x)$, where (1) $$F(x) = -\sum_{i=0}^{n} f_i \Delta'[x-x_i]$$

where (2) $$\Delta'[x-x_i] = \text{Min}[\text{Max}((x-x_i-\Delta),(-(x-x_i)-\Delta x)),0]$$

$x$ = input variable;
$\Delta x$ = a constant;
$x_i$ = the value of $x$ at the i-th sampling point;
Min, Max are operators selecting the smallest, respectively largest, of the quantities upon which they operate;

$$f_i = F(x_i)$$

and the values of $f_i$ are so chosen that $F(x)$ is a good approximation to $f(x)$. Approximately, $$f_i = f(x_i)$$

The spacing of sampling points, $\Delta x$, is constant, and thus (3) $$x_i = x_0 + i\Delta x$$

where $x_0$ is a constant.

Figure 1:
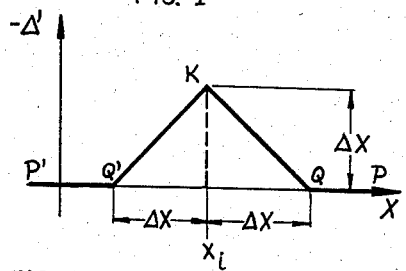

The function $\Delta'[x-x_i]$ is plotted in FIGURE 1. This function will be called the triangle function. K is the apex of the triangle and PQ, P'Q' are the shoulders of the triangle.

Figure 2:
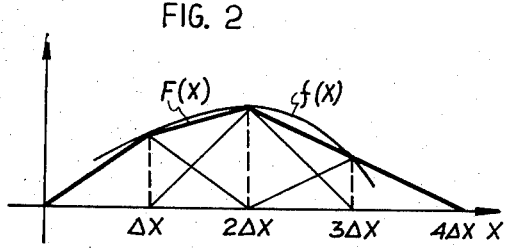
FIGURE 2 shows the combination of triangle functions to obtain the transfer characteristic of the complete function generator.

FIGURE 2 shows the production of $F(x)$ according to (1) as the sum of products of triangle functions and suitable constants, yielding an approximation to $f(x)$.

A schematic diagram of a circuit of the prior art for the production of a triangle function multiplied by $f_i$ will be described in connection with FIGURE 3 in which 1 and 2 are the input terminals accepting input signals $(x-x_i)-\Delta x$ and $-(x-x_i)-\Delta x$ respectively. Diodes $D_1$ and $D_2$, with common output connection at terminal 5, select the larger of said input signals which appears at 5. Diodes $D_3$ and $D_4$ with common output connection at terminal 8, select the smaller of the signal at 5 and zero, to produce a primary output signal at 8. Potentiometer 9 produces at its adjustable contact $t$ an output signal which is equal to the product of said primary output signal and a suitable constant which depends upon the setting of said potentiometer.

The prior art is described in the following references: T. E. Stern, "Piecewise-Linear Newtork Analysis and Synthesis," Proceedings of the Symposium on Nonlinear Circuit Analysis, Polytechnic Institute of Brooklyn, New York, 1956. F. Spada, S.B. Thesis, M.I.T., Cambridge, Mass., 1955.

Figure 3:
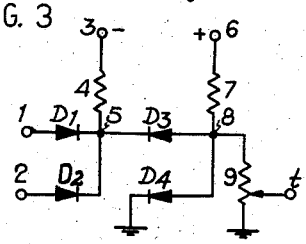
FIGURE 3 is a schematic diagram of the basic circuit of the prior art for the production of a triangle function.
Figure 4A:
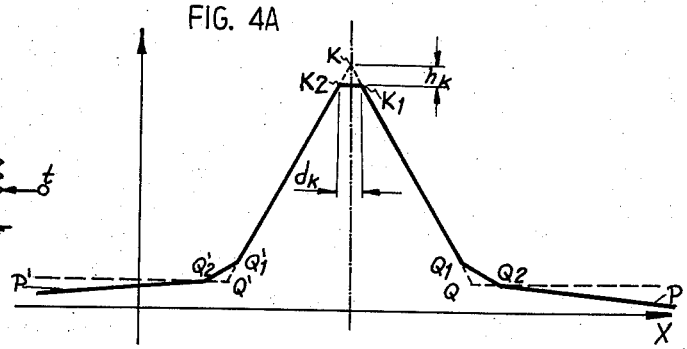
FIGURES 4a and 4b are plots of the actual transfer characteristic associated with the circuit of FIGURE 3.

The actual transfer characteristic of a circuit such as that of FIGURE 3 differs from the exact triangle function. As shown in FIGURE 4, the deviations from the triangle function are as follows:

(1) The apex and the shoulders are cut off, in the regions around K, and Q, Q', respectively.

(2) The shoulders of the triangle are not at zero height.

(3) The shoulders are not horizontal, i.e. they do not correspond to a constant output signal (regions QP, Q'P').

These deviations cause serious errors, and prior embodiments of function generators, with units such as that of FIGURE 3, are therefore quite unsuited to practical use.

The cutting of the apex is greater than that at the shoulders. If, for example, the function generator is adjusted to produce a constant output, the transfer characteristic will show peaks corresponding to the apexes of the triangles. The corresponding errors are about five percent of the output signal.

Because the shoulders do not correspond to zero output signal, the output of the circuit of FIGURE 3 depends upon the setting of its potentiometer even when variable $x$ is in the region of the shoulders. This results in an interdependence of the adjustments of the sampling point function values, $f_i$.

This invention provides means for the production of a function according to Equation 1 embodying compensation of errors, with an accuracy compatible with technical requirements.

One embodiment of a function generator of this invention will be described in connection with the block diagram of FIGURE 5 in which the input unit consists of blocks $A^+$ and $A^-$ and sign changing amplifier 35 which has unit gain. The variables are represented by voltages. Input voltage $x$ is accepted by input terminal $T_{in}^+$ and fed to block $A^+$ which output terminals are $T_i^+$; $i=1, 2 \ldots n$. $A^+$ produces at $T_i^+$ a voltage which is approximately equal to $$x - x_i - \Delta x$$
$$x_i = x_0 + i\Delta x$$

$i=1, 2 \ldots n$ for the instantaneous valve of $x$, where $x_0$ is a constant voltage.

$T_{in}^+$ is also connected to the input terminal of sign changer 35 which produces a voltage equal to $-x$ at input terminal $T_{in}^-$ of $A^-$. $A^-$ produces a voltage approximately equal to $$-(x-x_i) - \Delta x$$
$$x_i = x_0 + i\Delta x$$

$i=1, 2 \ldots n$ at terminal $T_i^-$; $i=1,2 \ldots n$; for the instantaneous value of $x$. Block $B_i$; $i=1,2 \ldots n$; is fed from terminals $T_i^+$ and $T_i^-$, and produces from its input voltages a primary output voltage equal to (4) $$e_{out} = K_1 \Delta'[x - x_i]$$

at terminal $t_i$. $t_i$ is connected to switch $S_i$ connecting $t_i$ either to terminal $t_i^+$ or to terminal $t_i^-$. $t_i^+$, $t_i^-$ are the input terminals to sign changing adders 36, 37, respectively. 36 is a sign changing adder of unity gain, producing at its output terminal the negative of the sum of its input signals. Terminals $T_i^-$, the output of terminals of 36, and terminal 38 are connected to the input of sign changer 37 which produces at output terminal T an output signal proportional to $F(x)$, Equation 1. Terminal 38 is supplied with a suitable constant voltage. Switch $S_i$ permits the selection of positive and negative values of $f_i$.

One embodiment of block $A^+$ of FIGURE 5 will be described in connection with FIGURE 6 in which 10 is an amplifier of unit gain, approximately, which shifts the D.C. level of its input signal to a suitable positive value. The output terminal of amplifier 10 is connected to the grid terminal of triode $V_1^+$ whose anode is connected at terminal 11 to a suitable positive D.C. voltage. The cathode of $V_1^+$, at terminal 12, is connected to a series combination of potentiometers $P_i$; $i=1,2 \ldots n$; and $Q_j$; $j=1,2 \ldots m$. This series combination will be called a ladder. The adjustable contact of each potentiometer $Q_j^+$ is shortened to one of the end terminals of $Q_j^+$. The adjustable contact of each potentiometer $P_i^+$ is connected to input terminal $C_i^+$ of impedance converter $CF_i^+$. $CF_i^+$ have a practically infinite input impedance and a low output impedance. The second terminal of the ladder, 13, is the input terminal of constant current device 14. $V_1^+$ thus functions as a cathode follower operating with constant anode current and producing at 12 a signal which is proportional to the input signal at $T_{in}^+$. The D.C. levels of said signals at $T_{in}^+$ and 12 need not be equal. The same constant current flows through all the elements of the ladder. Potentiometers $P_i$ and $Q_j$ are so adjusted that the difference of D.C. levels between adjacent terminals $C_i$ is approximately constant. Because of the constancy of current through the ladder the signals of all $C_i$ are equal to the signal at 12.

Constant current device 14 contains two triodes, $V_2^+$ and $V_3^+$. The anode of $V_2^+$ is connected to terminal 13 and its cathode is connected to the anode of $V_3^+$ whose cathode is connected to resistor 17 which is connected to a suitable negative D.C. voltage at terimnal 18. The grids of said triodes are supplied with suitable constant potentials through potentiometers 15 and 16, respectively. This constant current device has a high incremental input resistance $R_{in}$ at terminal 13, which is given by (5) $$R_{in} = r_{p2} + (M_2 + l)[r_{p3} + (M_3 + l)R_k]$$

where $M_2$, $M_3$ are the amplification factors and $r_{p2}$, $r_{p3}$ are the plate resistances of $V_2^+$ and $V_3^+$, respectively, and $R_k$ is the resistance of resistor 17.

A constant current device in which $V_3^+$ and its associated circuits is replaced by a resistor connected between the cathode of $V_2^+$ and terminal 18, is not suitable in this embodiment of the function generator of this invention because it does not yield a sufficiently high incremental resistance at 13, for the required accuracy.

The signals at $C_i^+$ are fed to impedance converters $CF_i^+$ which produce at their output terminals $T_i$ voltages equal to (6) $$(x-x_i) - \Delta x + \epsilon_i^+$$

for $i=1, 2 \ldots n$; respectively; where $\epsilon_i^+$ are small compensating voltages which will be discussed later.

Figure 5:
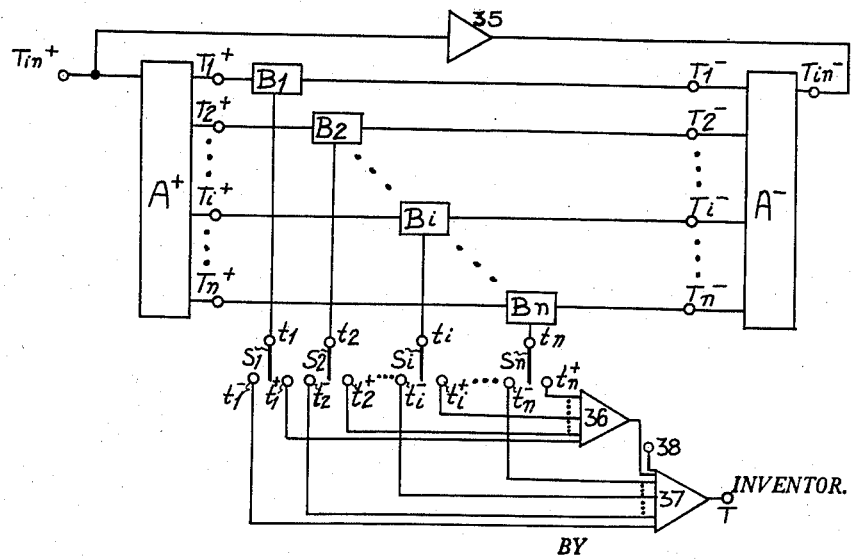
FIGURE 5 is a block diagram of one embodiment of a function generator of this invention.

Potentiometers $P_i^+$ and $Q_j^+$ may be adjusted when block $A^+$ is connected in the function generator, FIGURE 5. Measurements are carried out at output terminal T, FIGURE 5. $P_i^+$ is so adjusted that the $i$th triangle function is centered on $x = x_i$. Because of the inequality in the resistances of potentiometers $P_i^+$, which may amount to plus or minus 5 percent, for example, additional potentiometers $Q_j^+$ are inserted in the ladder in order to shift the D.C. level along potentiometers $P_i$ into the proper range.

Block $A^-$ produces at terminal $T_i^-$ a voltage equal to (7) $$-(x-x_i) - \Delta x + \epsilon_i^-$$

and the circuit and manner of operation of $A^-$ will be quite clear from the above description.

All blocks $B_i$ of FIGURE 5 are identical. One embodiment of block $B_i$ will be described in connection with the schematic diagram of FIGURE 7 in which $T_i^+$ and $T_i^-$ are the input terminals, identical with the terminals with the same designations in FIGURE 5. Resistors 21, 22 are connected between $T_i^+$, $T_i^-$ and the anodes of diodes $D_1$, $D_2$, respectively, said diodes having a common output connection at terminal 25 which is connected through resistor 24 to terminal 23 which is at the constant negative potential $-V_1$ whose absolute value is larger than the maximum of the absolute values of the input voltages to this block. The cathode of diode $D_3$ is connected to 25 and its anode is connected to terminal 30. 26 is the input terminal for a constant voltage U. Resistor 27 is connected between 26 and the cathode of diode $D_4$ whose anode is connected to 30. Resistor 29 connects 30 to terminal 28 which is at the constant positive potential $V_2$. Output potentiometer 32 is connected to 30 and is grounded at its other terminal 33. Its adjustable contact is connected to output terminal $t_i$. Denoting the potential at 30 by $e_0$, the potential at $t_i$ will thus be equal to $ke_0$, where $0 \leq k \leq 1$. If resistors 21, 22 and 27 are small with respect to resistors 24 and 29, the transfer characteristic of the circuit of FIGURE 7 will be similar to that of FIGURE 3. The differences in the operation of these two circuits are, however, significant, as will now be described in detail.

The operation of the circuit of block $B_i$, FIGURE 7, will be explained in connection with FIGURES 8 and 9. FIGURE 8 illustrates an equivalent circuit to that of FIGURE 7. In this equivalent circuit each diode is represented as an ideal diode in series with a resistor, whose resistance is equal to its internal resistance, when conducting. If said diodes are semiconductor diodes, for example, it is necessary to add in series with said diodes additional voltage sources which represent their offset voltages. The effect of said offset voltages will be analyzed later and said additional voltage sources have been omitted in FIGURE 8. $r_1^+$, $r_1^-$ represent the sum of the internal resistances of $D_1$, $D_2$ and the resistances of 21, 22 and the output resistances of $CF_i^+$, $CF_i^-$, respectively. Said resistances are so chosen that $$r_1^+ = r_1^- = r_1$$

The potentials at 52, 53 are the open circuit voltages of $CF_i^+$, $CF_i^-$, respectively. $r_2$ is the sum of the resistance of 27 and the internal resistance of $D_4$. $r_6$ is the internal resistance of $D_3$. Resistors 24, 29, 32 have resistance values $R_1$, $R_2$, $R_7$, respectively, which are large with respect to resistances $r_1$, $r_2$, $r_6$, in this example.

The input voltages to terminals 52, 53 are $$(x-x_i) - \Delta x + \epsilon_1^+$$
$$-(x-x_i) - \Delta x + \epsilon_1^-$$

respectively.

The errors in the transfer characteristic of the circuit of FIGURE 3 are explained above in connection with FIGURE 4. The circuit of FIGURE 7 has a similar transfer characteristic. This invention provides compensation of said errors by proper choice of the components of embodiments such as that of FIGURE 7, such that in the combined transfer characteristic of the function generator, FIGURE 2, the errors at the apexes of the triangle functions and the errors at their shoulders cancel, approximately. In the following example, the errors will be minimized for the case that $f(x)$=constant.

The cutting of the shoulders and the apex is a result of non-vanishing resistances $r_1^+, r_1^-, r_2$ and $r_6$, FIGURE 8, which give rise to regions in which $D_1$ and $D_2$ or $D_3$ and $D_4$ conduct simultaneously. Simultaneous conduction of $D_1$ and $D_2$ corresponding to the cutting of the apex, and simultaneous conduction of $D_3$ and $D_4$ corresponding to the cutting of the shoulders.

Referring to FIGURE 4, analysis of the equivalent circuit of FIGURE 8 shows that the triangle function is cut off at a height $h_k$ below its apex, where (8) $$h_k = \frac{r_1}{2}\left(\frac{V_1}{R_1} - \frac{V_2}{R_2}\right)$$

The cut-off region being of width $d_k$ (9) $$d_k = r_1\left(\frac{V_1}{R_1} - \frac{V_2}{R_2}\right)$$

provided $R_1$, $R_2$, $R_7$ are large with respect to $r_1$, $r_2$ and $r_6$.

Figure 4B:
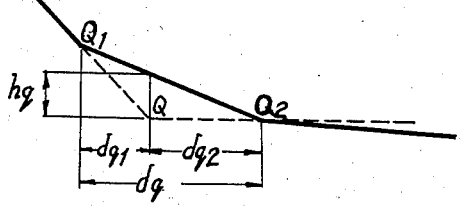

At the shoulders, $h_q$ and $d_q = d_{q1} + d_{q2}$, FIGURE 4B, are given by

(10) $$h_q = \frac{(r_1+r_2)r_6}{(r_1+r_2+r_6)R_2}V_2$$

(11) $$d_q = \frac{(r_1+r_2)+r_6}{R_2}V_2$$

For said compensation it is necessary that

(12) $$d_{q1} = d_{q2}$$

(13) $$d_q = d_k$$

and

(14) $$2h_q = h_k$$

Introducing conditions (8), (9), (10), (11) into (13), (14), yields:

(15) $$\frac{r_1+r_2+r_6}{R_2}V_2 = r_1\left(\frac{V_1}{R_1} - \frac{V_2}{R_2}\right)$$

(16) $$2\frac{(r_1+r_2)r_6}{(r_1+r_2)+r_6}\frac{V_2}{R_2} = \frac{r_1}{2}\left(\frac{V_1}{R_1} - \frac{V_2}{R_2}\right)$$

(15) and (16) are satisfied if

(17) $$r_6 = r_1 + r_2$$

and

(18) $$\frac{r_6}{r_1} = \frac{1}{2}\left[\left(\frac{V_1}{V_2}\right)\left(\frac{R_2}{R_1}\right) - 1\right]$$

(17) and (18) solve conditions (12) (13) (14).

Because of the fact that the internal resistance of the diodes is a function of their current, when said diodes are conducting, the compensation obtained is not perfect. FIGURES 9A, 9B, show the output signal of the function generator when adjusted to produce constant output in the region around $x=x_i$. FIGURE 9A corresponds to the case without compensation and FIGURE 9B corresponds to the case with compensation according to this invention. Whereas the deviation from a constant is of the order of five percent in the case of FIGURE 9A, it is less than one percent in the case of FIGURE 9B.

An indication for possible component values for the embodiment of this invention corresponding to FIGURE 7 is obtained from Equations 17 and 18. Final adjustment to obtain best compensation may be obtained experimentally.

The correction of the level of the shoulders of transfer characteristic of block $B_i$, according to this invention, will be described in connection with FIGURE 10 which is an equivalent schematic diagram of the embodiment of $B_i$ of FIGURE 7, for the state in which only one diode of each pair of diodes $D_1$, $D_2$ and $D_3$, $D_4$ conducts, under the assumption that diode current is approximately constant, where $\epsilon_1$, $\epsilon_2$, $\epsilon_3$ and $\epsilon_4$ are constant voltage sources and said diodes are ideal diodes. For input voltages

(19) $$(x-x_i) - \Delta x$$
(20) $$-(x-x_i) - \Delta x$$
(21) $$U$$

at 52, 53, 26 respectively, $e_0$ is

(22) $$e_0 = k_i \text{Min}[\text{Max}((x-x_i) - \Delta x - \epsilon_1, -(x-x_i) - \Delta x - \epsilon_2) + \epsilon_3, U + \epsilon_4]$$

This invention adjusts the input voltages at 52, 53 and 26 so that the shoulders of the triangle function corresponding to $e_0$ are at zero level. One way of doing this is the adjustment of the voltages at 52, 53 and 26 to the following values,

(23) $$(x-x_i) - \Delta x + \epsilon_1 - \epsilon_3$$
(24) $$-(x-x_i) - \Delta x + \epsilon_2 - \epsilon_3$$
(25) $$-\epsilon_4$$

respectively. The values of (23) and (24) are slightly different from those given by (19) and (20), and said adjustment can be done, for example, by adjustment of potentiometers $P_i^+$, $P_i^-$, FIGURE 6. $e_0$ is then equal to

(26) $$e_0 = k_i \text{Min}[\text{Max}(x-x_i) - \Delta x, -(x-x_i) - \Delta x), 0]$$

The effect of the non-zero level of the shoulders of the transfer characteristic of $B_i$ may be compensated in other ways. For example, terminal 26, FIGURE 7, may be grounded, whereas terminal 33 is connected to a suitable constant voltage as illustrated in the schematic equivalent diagram of FIGURE 11. Taking input voltages $$(x-x_i) - \Delta x + \epsilon_1 - \epsilon_3 + \epsilon_4$$
$$-(x-x_i) - \Delta x + \epsilon_2 - \epsilon_3 + \epsilon_4$$
$$\epsilon_4$$

at 52, 53 and 33, respectively, $e_0$ is now equal to

(27) $$e_0 = k_i \text{Min}[\text{Max}((x-x_i) - \Delta x, -(x-x_i) - \Delta x), 0] + \epsilon_4$$

which differs from (26) by an offset voltage which is independent of $k_i$, and thus of the adjustment of potentiometer 32. Such a constant offset voltage, which is independent of $k_i$, can be compensated in the function generator by adding a suitable constant voltage at terminal 38, FIGURE 5, of output amplifier 37, for example.

Another source of errors is the finite backward resistance $R_b$ of diode $D_3$, which causes an inclination of the shoulders of the transfer characteristic of $B_i$, as shown in FIGURE 4. Because of said inclination, the adjustment of potentiometer 32 of $B_i$ affects the output voltage of the function generator even in regions of $x$ outside $$x_i - \Delta x \leqslant x \leqslant x_i + \Delta x$$

thus causing interdependence of adjustments of sampling point function values $f_i$. It can be shown that, for a maximum fractional error $\delta_{max}/\Delta x$ of the function generator due to finit $R_b$, when producing a constant output function, $f(x)$ = constant, it is required that $$R_b > \frac{n(n-1)}{2} \cdot \frac{\Delta x}{\delta_{max}} \cdot r_6$$

where $R_b$ is the backward resistance of $D_3$.

For one example of a function generator of the embodiment of this invention described in connection with FIGURES 5, 6, 7 and 12, components and component values will now be specified.

This example relates to an interpolating piecewise linear function generator with $n=21$ adjustable sample point function values, for operation in conjunction with an analog computer with computing voltages in the range of $-50$ to $+50$ volts. An overall accuracy of plus or minus one percent obtains in this example. The inclination of the shoulders of the triangle function and the deviation of the level of said shoulders are negligible in this example.

In block $B_i$, FIGURE 7, all diodes are silicon junction diodes. $D_1$ and $D_2$ are of type HD-6303; $D_3$ and $D_4$ are of type HD-6304; resistances and voltages are chosen so that $$\frac{R_2}{R_1} = 2; \; r_2 \gg r_1; \; \frac{r_6}{r_1} \cong 1$$

24, $R_1 = 1$ megohm
29, $R_2 = 2$ megohms
21, 22 are 2.2 kilo-ohms each
27 is 2.6 kilo-ohms.

Cathode followers $CF_1^+$, FIGURE 12, use triode 43 of type 12AX7 with a cathode resistor 41 of 100 kilo-ohms and voltages 170 volts, $-250$ volts, at 40, 42 respectively.

Voltages at 23, 28 are $x - 250$ volts, 170 volts, respectively.

32 is a linear potentiometer of 100 kilo-ohms.
Terminal 33 is grounded.
Voltage at 26 is $-0.75$ volt, approximately.
In block $A^+$, FIGURE 6, all tubes are of type 12AX7.
Potentiometers $P_1^+$ are of 5 kilo-ohms.
Potentiometer $Q_1^+$ is 50 kilo-ohms; $Q_2^+$ to $Q_5^+$ are 5 kilo-ohms, and are inserted between $P_4^+$, $P_5^+$; $P_9^+$, $P_{10}^+$; $P_{14}^+$, $P_{15}^+$; $P_{20}^+$ and the anode of triode $V_2^+$; respectively.

15, 16 are each a series combination of two constant resistors and a linear potentiometer of 50 kilo-ohms each.
Voltages at 11, 18 are 170 volts, $-250$ volts, respectively.
10 is a conventional D.C. amplifier.
Similar values obtain for block $A^-$.
Amplifiers 35, 36, 37, FIGURE 5, are conventional operational amplifiers.

It is apparent that we have provided a piecewise-linear interpolating one-dimensional function generator with error compensation and an accuracy compatible with technical requirements which permits the production of a function with independent adjustment of sampling point function values.

Although this invention has been described and illustrated in detail it is to be understood that the same is by way of illustration and example only and is not to be taken by way of limitation, the scope of this invention being limited only by the terms of the appended claims.

What is claimed is:

1. A generator for the production of a compensated triangle function $\Delta(x-x_i)$, approximating the triangle function $$\Delta'(x-x_i) = \text{Min}\{\text{Max}[x-x_i-\Delta x, -(x-x_i)-\Delta x], 0\}$$

for the instantaneous value of $x$, where $\Delta x$ is a suitable constant, comprising first and second input means for generating first and second output signals which are suitable linear functions of $x$; first and second diode means with a first common output connection responsive to said first and second signals for producing therefrom a third signal; constant signal means; third and fourth diode means with common output connection responsive to said third signal and said suitable constant signal to produce a fourth signal; and a plurality of suitable compensating resistance means connected in series with said diode means, for compensating the rounding off of the apex and the corners of said compensated triangle function such as to improve the approximation of $$\Delta'(x-x_{i-1}) + \Delta'(x-x_i) + \Delta'(x-x_{i+1})$$

to a constant in the interval $$x_{i-1} < x < x_{i+1}$$

where $$x_i = x_0 + i\Delta x$$

and $x_0$ and $\Delta x$ are suitable constants.

2. The device as recited in claim 1 wherein said diode means are adapted to have high backward resistance for improving the constancy of said triangle function in its shoulder regions.

3. The function generator of claim 1 comprising potentiometer means responsive to said fourth signal for producing therefrom a fifth signal which is equal to the product of said fourth signal and a positive constant $f_i$ the value of which depends upon the setting of said potentiometer means.

4. The function generator of claim 1 comprising suitable constant potential means connected to said diode means for adjusting the shoulder level of said compensated triangle function.

5. The function generator of claim 3 comprising second constant potential means connected to said potentiometer means for the elimination of the dependence upon $f_i$ of $F(x)$ in the shoulder regions of $\Delta'(x-x_i)$.

6. In a generator of a function of one variable comprising first means including a plurality of channel means responsive to a primary input signal $x$ representing said variable for producing therefrom a plurality of secondary signals, where the $i$th secondary signal approximates the value of the triangle function $$\Delta'(x-x_i) = \text{Min}\{\text{Max}[x-x_i\Delta x, -(x-x_i)-\Delta x], 0\}$$

where $x_i = x_0 + i\Delta x$ and $\Delta x$, $x_0$ are suitable constants; a plurality of second means connected to said first means for producing a plurality of tertiary signals equal respectively to the products of said secondary signals and a plurality of suitable quantities $f_i$ where $f_i$ = constant; said tertiary signals being equal to $f_i\Delta'(x-x_i)$; summing means for summing said tertiary signals to generate a sum $F(x)$
where $$F(x) = -\sum_{i=0}^{n} f_i \Delta'(x-x_i)$$

which is a piecewise-linear approximation to said function for the instantaneous value of $x$; the improvement being each of said channel means including first and second diode means with a first common output connection responsive to said first and second signals for producing therefrom a third signal; constant signal means; third and fourth diode means with common output connection responsive to said third signal and said suitable constant signal to produce a fourth signal; and a plurality of suitable compensating resistance means connected in series with said diode means, for compensating the rounding off of the apex and the corners of said compensated triangle function.

7. The function generator of claim 6, comprising input means responsive to said primary input signal $x$ for producing a plurality of linear output signals which are suitable linear functions of said primary input signal; the outputs being accepted as input signals of said input means being impressed upon associated ones of said channel means.

8. The function generator of claim 7, comprising input means for producing from said primary signal a plurality of first and second linear output signals which are suitable linear functions thereof, said input means comprising a series combination of constant resistance means and a plurality of second potentiometer means for producing at each of the adjustable contacts of said potentiometer means one of said linear output signals, said second potentiometer means being adapted to shift the level of the associated linear output signals without affecting any of the remaining linear output signals; and constant current generating means for supplying a constant current to said series combination of resistance means and potentiometer means.

9. The device as recited in claim 8, comprising additional second adjustable resistance means inserted in said series combination of constant resistance means and potentiometer means, said adjustable resistance means being adapted to shift the level of only those secondary input signals associated with those of said potentiometer means that lie on one side of said adjustable resistance means along said series combination of resistance means and potentiometer means.

10. The function generator of claim 8 in which said constant current means comprise a series combination of first and second amplifier tubes arranged in a cathode to anode connection, for producing said constant current.

11. The function generator of claim 8 comprising in addition a plurality of impedance converting means connected to said adjustable potentiometer contacts for producing said first and second linear output signals at a low impedance level.

12. The function generator of the type described comprising a plurality of channel means embodying function generators, each of said generators being adapted to produce a compensated triangle function $\Delta(x-x_1)$, approximating the triangle function $$\Delta'(x-x_1)=\mathrm{Min}\{\mathrm{Max}[x-x_1-\Delta x, -(x-x_1)-\Delta x], 0\}$$

for the instantaneous value of $x$, where $\Delta x$ is a suitable constant, the improvement comprising each of said channel means comprising first and second input means for generating first and second output signals which are suitable linear functions of $x$; first and second diode means with a first common output connection responsive to said first and second signals for producing therefrom a third signal; constant signal means; third and fourth diode means with common output connection responsive to said third signal and said suitable constant signal to produce a fourth signal; and a plurality of suitable compensating resistance means connected in series with said diode means, for compensating the rounding off of the apex and the corners of said compensated triangle function such as to improve the approximation of $$\Delta'(x-x_{i-1})+\Delta'(x-x_i)+\Delta'(x-x_{i+1})$$

to a constant in the interval $$x_{i-1} < x < x_{i+1}$$

where $$x_i = x_0 + i\Delta x$$

and $x_0$ and $\Delta x$ are suitable constants.

References Cited in the file of this patent

Philbrick: Continuous Electronic Representation of Nonlinear Functions of $n$ variables—A Palimpsest on the Electronic Analog Art; printed by Geo A. Philbrick Researcher, Inc., Boston, Mass., 1955, pp. 266–270.

Miura et al.: A New Diode Function Generator, I.R.E. Trans. on Electronic Computers, June 1957, pp. 95–100.